Sept. 4, 1934.     J. A. SPENCER     1,972,170
VALVE
Filed June 20, 1930
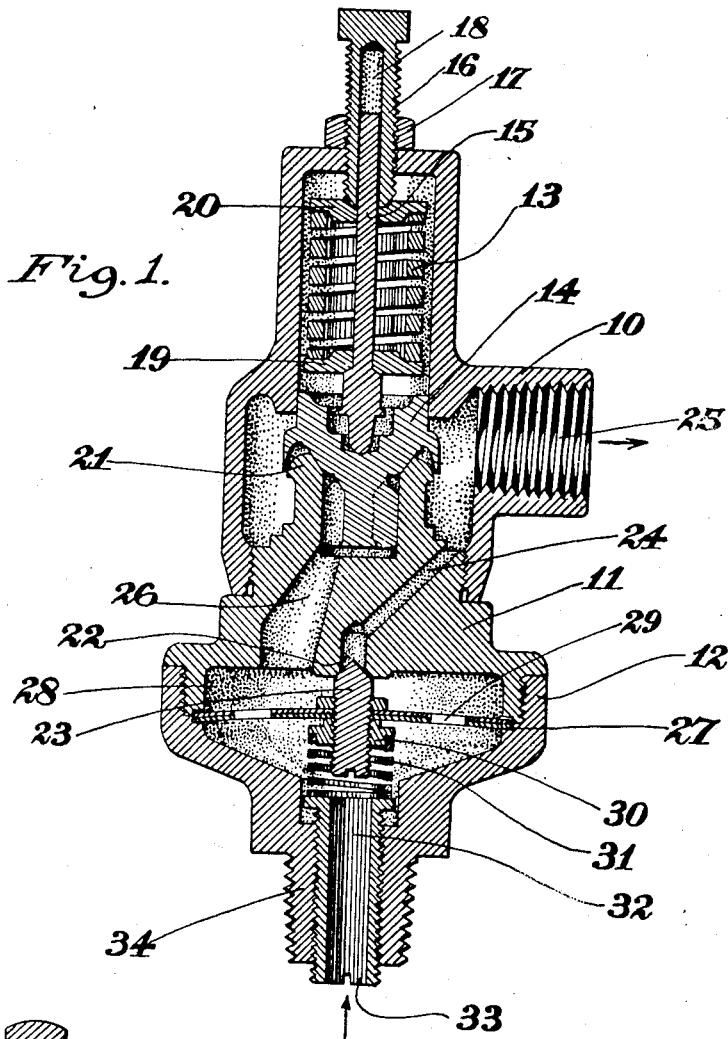
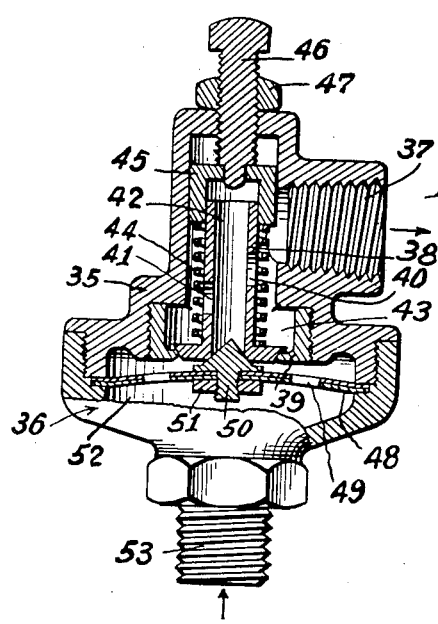
John A. Spencer, INVENTOR.
BY
Bonifaul Hamilton
ATTORNEY.

Patented Sept. 4, 1934

1,972,170

UNITED STATES PATENT OFFICE 1,972,170

VALVE

John A. Spencer, Newton, Mass., assignor to The Spencer Thermostat Company, Cambridge, Mass., a corporation of Massachusetts Application June 20, 1930, Serial No. 462,663

2 Claims. (Cl. 137—139)

The present invention relates to a valve which is adapted to be installed in means supplied with fluid, and in which means it is desirable to prevent overheating of the fluid. The valve of the present construction serves as a temperature and pressure relief valve to prevent over-heated fluid from reaching an outlet where damage may be incurred, and to relieve any abnormal pressure which may be set up in the line.

The invention has for its object the provision of a temperature controlled valve combining the features of temperature and pressure relief in a single housing, the construction of the valve being compact and being positive as well as fully automatic in its operation. Other objects will be in part obvious and in part pointed out hereinafter.

In the prior art, it is customary to employ separate valves for the purpose accomplished by the single unit herein described, it being also customary in the prior art to relieve excess temperature through the melting of a fusible metal, there being no means of automatically cutting off the escape of fluid when it has cooled to a safe point.

The housing of the present construction is designed to contain two separate and independent valve members, one of which members is thermostatically operated, the other valve member being operated by fluid pressures in excess of a predetermined amount, the valve members being so constructed that they will positively reseat after each opening. The operating conditions of the valve members may be adjusted as desired through adjustment of the pressure of a spring seated against each valve member, the spring pressure also assuring the re-seating of the valve members after each operation thereof.

It will be understood that one of the advantages inherent in the present construction over the prior art resides in the fact that in the present case there is provided a temperature responsive member controlling the temperature relief valve which will automatically change its shape under influence of temperatures of predetermined range, so that the control of the valve is entirely automatic. The temperature responsive member is desirably a composite bimetallic thermostatic sheet formed of two materials having different coefficients of thermal expansion, this thermostat having the property, as above mentioned, of automatically changing its shape upon temperature variations of predetermined range. It will be understood that such a thermostat is a quick acting device, the construction and properties of which are set forth and claimed in my prior United States Patent No. 1,448,240, March 13, 1923. It will be understood, however, that instead of a snap acting thermostatic device of this character, there may be employed any other type of thermostat of suitable construction, depending upon the manner in which it is desired that the valve operate.

The invention will be more readily understood from reference to the accompanying drawing;

Figure 1 illustrates one construction in accordance with the present invention, the view being in longitudinal section through the valve;

Figure 2 is a sectional view similar to Figure 1 of a somewhat different form of construction.

Similar reference characters indicate corresponding parts throughout the several views of the drawing.

Referring more particularly to Figure 1, the valve housing is illustrated as being in three parts or sections, 10, 11 and 12, assembled together preferably in removable relationship. Valve housing 10 contains a spring 13 and a valve 14, the valve 14 having a stem 15, the pressure under which the valve is seated being adjustable through the pressure of the spring 13 which may be varied as desired by manipulation of the adjusting screw 16, secured in desired position by the lock-nut 17. The adjusting screw 16 is hollow to form a guide 18 for the valve stem 15. It will be observed that the spring 13 bears against the collars 19 and 20 secured to the stem 15. Obviously the lock-nut 17 must be loosened to operate the screw 16.

Portion 11 of the valve housing is in the form of a casting, a portion of which forms a hollow seat 21 for the valve 14, and also a hollow valve seat 22 for the valve 23, which will be described in more detail hereinafter. The housing portion 11 also contains a passage 24 extending through the body of the casting to bring the valve seat 22 into communication with the outlet 25. It also contains the passage 26 which permits fluid to reach the outlet 25 when the valve 14 is moved from its seat 21. It will be seen that the valve 14 is so shaped that its face will be exposed to pressure of fluid in the housing.

The housing portion 12 is formed so as to retain the perforated thermostatic element 27 between itself and the section 11 of the housing, so that when assembled there is a relatively large space formed on both sides of the thermostat 27. In operation, fluid passes through the thermostat 27 by way of apertures 29 to fill the space 28 and passage 26 and to act against the face of the valve 14. Thermostat 27 carries the valve 23 which seats on the seat 22 to close the passage 24. The valve 23 has a collar 30 about it, this collar forming a bearing member for the spring 31, the pressure of which is adjusted by the hollow screw 32 having through it the intake passage 33.

The operation of this valve is as follows: Fluid, for example, a liquid such as water, flows into the housing, but its passage therethrough is normally obstructed by the valves 14 and 23 being seated under the pressure of their respective springs. The pressure of the water aids in holding the thermostatic valve 23 seated.

If the temperature of the fluid reaches the operating temperature of the thermostat 27, this thermostat will act against the pressure of the spring 31 to unseat the valve 23 to allow the fluid to pass out through the passage 24 and the outlet 25.

It should be understood in this connection that the spring 31 must not be of such strength as will prevent thermostat 27 from operating, and it will further be obvious that ports 29 through the thermostat are of such area as will permit ready passage of fluid therethrough. Fluid will then pass until the temperature drops sufficiently to cause thermostat 27 to seat the valve, and the temperature at which the operation of this valve takes place can be readily determined by the amount of pressure put upon the spring 31 through operation of the screw 33.

Due to the arrangement of the pressure relief valve 14, whereby it closes up stream, and the temperature relief valve 22, whereby it closes down stream, the device as a whole is adapted to function as a vacuum relief valve as well. This will be understood when it is considered that, should the pressure in the hot water apparatus fall below atmospheric, this sub-atmospheric pressure will exist in the passage 32, the chamber 28, and the passage 26, up to the valves 14 and 22. The atmospheric pressure in the outlet 25, and hence in the passage 24 as well, will then exert itself in helping to seat the pressure valve 14 more tightly, as it closed up stream; but as to the temperature relief valve 22, the greater atmospheric pressure will tend to unseat and hence open the valve, as it closes down stream and this pressure is in the nature of an up stream force. Thus is vacuum relief as well obtained.

It will be apparent that fluid is always filling the space 28 and the passage 26 to exert pressure on the face of the valve 14, and as long as this pressure is less than the pressure of the spring 13, as determined by the adjustment of the screw 16, the valve will be seated; but if the pressure exceeds the predetermined pressure of the spring 13, the valve 14 will be unseated so that fluid will flow out through passage 26 and outlet 25 until its pressure again drops below the pressure of the spring 13, when the valve 14 will be again seated.

It will be apparent that the operating conditions of the valves 23 and 14 may be adjusted to any desired predetermined value by adjustment of screws 33 and 16 respectively, so that the temperature and pressure under which the fluid reaches the appliance can be controlled as desired. It is apparent from the drawing, that the valve is inserted into the line through which the fluid is passing by any suitable means, as for example, threads 34.

Figure 2 illustrates a structure in general similar to that just described. In Figure 2 the valve housing is formed of the sections 35 and 36, conveniently in removable relationship. Section 35 of the valve housing carries the fluid outlet 37, and has within it the hollow valve 38 seating on the member 39 threaded into section 35, the valve 39 having a passage through it and having ports 40 and 41 passing through its sides to provide communication between the interior passage 42 in the valve 38 and the space 43 between the valve and walls of the section 35. Bearing against the upper face of the valve 38 is a coil spring 44 bearing against the member 45, this member being slidable within the housing 35 and guided by the internal walls thereof. Motion is transmitted to the member 45 through the screw 46 held in predetermined position by a lock-nut 47. Operation of the screw 46 results in compression or retraction, as desired, of the coils of the spring 44, thus varying at will the pressure exerted upon the valve 38.

Section 36 of the valve housing carries the thermostat 48 so that when assembled the thermostat is secured between the sections 36 and 35. Thermostat 48 is provided with ports 49, and carries the valve 50 secured by a lock-nut 51 and seating on the passage 42 in the valve 38. The valve housing is inserted in a fluid line through which fluid, such as water, passes on its way to the appliance, threads 53 providing a convenient means for insertion.

If the temperature of the fluid reaches the operating temperature of the thermostat 48, the thermostat will operate to unseat valve 50, the fluid then passing through the ports 49 into the passage 42 of the valve 38, then out through the ports 40 and 41 between the coils of the spring 44 into the space 43 around the valve 38 and thence out through the outlet 37. This action will continue until the temperature drops sufficiently to allow the thermostat 48 to act to seat the valve 50 over the passage 42.

It will be seen that, because of ports 49, fluid will always fill the space 52 around the thermostat, and will always subject the valve 38 to its pressure. If this pressure on the face of the valve 38 exceeds the pressure exerted upon the valve by the spring 44, the valve 38 will be unseated, and the fluid will flow around the valve into the surrounding space 43 and then out through the outlet 37. Obviously the pressure at which valve 38 will operate can be adjusted as desired by operation of the screw 46.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

What is claimed is:

1. The combination with a valve housing of a temperature controlled valve member within the housing, a pressure controlled valve member within another portion of the housing, the operation of each valve member being independent of the operation of the other, a snap acting thermostat adapted to control said temperature controlled valve, and means for varying as desired the operating condition of at least one of the valve members.

2. A valve comprising the combination with a housing divided into sections of a thermostatically actuated valve in one of the said sections, and a snap acting thermostat adapted to actuate said valve, a pressure actuated valve in another section, the said pressure actuated valve being controlled by fluid pressure, while the thermostatically actuated valve is controlled by the temperature of the said fluid, and means for adjusting the operating ranges of the valves.

JOHN A. SPENCER.